(12) United States Patent
Kozlowski

(10) Patent No.: US 8,251,828 B2
(45) Date of Patent: Aug. 28, 2012

(54) CONSTANT VELOCITY JOINT

(75) Inventor: Keith A. Kozlowski, Lynn Haven, FL (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 125 days.

(21) Appl. No.: 12/732,243

(22) Filed: Mar. 26, 2010

(65) Prior Publication Data

US 2011/0077090 A1 Mar. 31, 2011

Related U.S. Application Data

(60) Provisional application No. 61/164,246, filed on Mar. 27, 2009.

(51) Int. Cl.
*F16D 3/221* (2006.01)
(52) U.S. Cl. .......... 464/141; 464/906
(58) Field of Classification Search .......... 464/139, 464/141–143, 151, 906
See application file for complete search history.

(56) References Cited

U.S. PATENT DOCUMENTS

| | | | |
|---|---|---|---|
| 1,103,716 A * | 7/1914 | Wallbillich | 464/141 |
| 1,763,206 A | 6/1930 | Woveris | |
| 3,296,830 A * | 1/1967 | Runkle | 464/139 |
| 4,019,347 A * | 4/1977 | Krude | 464/906 |
| 4,224,808 A | 9/1980 | Gehrke | |
| 4,472,159 A | 9/1984 | Krude | |
| 4,556,400 A | 12/1985 | Krude et al. | |
| 4,611,373 A * | 9/1986 | Hazebrook | 464/906 |
| 4,685,897 A | 8/1987 | Krude | |
| 4,753,626 A | 6/1988 | Hazebrook et al. | |
| 4,832,657 A | 5/1989 | Hahn | |
| 5,230,659 A * | 7/1993 | Bird et al. | 464/906 |

(Continued)

FOREIGN PATENT DOCUMENTS

FR   1.218.118 A   5/1960

(Continued)

OTHER PUBLICATIONS

E.R. Wagner, P.E., "Basic Requirements for Constant Velocity Universal Joints" Universal Joint and Driveshaft Design Manual, AE-7, Society of A Automotive Engineers, Inc., Warrendale, PA pp. 99-101, TJ1079, S62 1979.

*Primary Examiner* — Gregory Binda
*Assistant Examiner* — Josh Skroupa
(74) *Attorney, Agent, or Firm* — Cantor Colburn LLP

(57) ABSTRACT

A constant velocity joint is disclosed that includes a first rotatable shaft comprising an axle portion having on one end an enlarged pocket end, the pocket end having a plurality of circumferentially and radially spaced ball pockets; a corresponding plurality of spherical balls disposed in the pockets; and a second rotatable shaft comprising a joint housing, the joint housing having a central bore with a corresponding plurality of axially extending, circumferentially and radially spaced ball grooves disposed about the second longitudinal axis and a base, the joint housing disposed over the pocket end with the corresponding plurality of balls disposed in the grooves, the joint providing a range of angular and axial movement of the first shaft relative to the second shaft, each of the plurality of ball pockets comprising a portion of the pocket having a conformity ratio C greater than about 1.04.

20 Claims, 7 Drawing Sheets

U.S. PATENT DOCUMENTS

| | | |
|---|---|---|
| RE34,341 E | 8/1993 | Fukumura et al. |
| 5,267,905 A | 12/1993 | Wenzel et al. |
| 6,264,568 B1 | 7/2001 | Frazer et al. |
| 6,280,338 B1 | 8/2001 | Hayama et al. |
| 6,537,045 B2 | 3/2003 | Riegger et al. |
| 6,685,571 B1 | 2/2004 | Smith |
| 6,910,970 B2 * | 6/2005 | Kobayashi .................... 464/906 |
| 7,624,819 B1 | 12/2009 | LeBlanc et al. |
| 7,690,999 B2 * | 4/2010 | Nozaki et al. |
| 2005/0272510 A1 | 12/2005 | Nakagawa et al. |
| 2007/0161428 A1 * | 7/2007 | Nakao et al. |
| 2009/0156319 A1 | 6/2009 | Mondragon et al. |

FOREIGN PATENT DOCUMENTS

| | | |
|---|---|---|
| GB | 1596837 | 9/1981 |
| WO | WO 8809445 | * 12/1988 |

* cited by examiner

CONSTANT VELOCITY JOINT

CROSS-REFERENCES TO RELATED APPLICATIONS

This patent application claims priority to U.S. Provisional Patent Application Ser. No. 61/164,246 filed Mar. 27, 2009.

FIELD OF THE INVENTION

The subject invention generally relates to a constant velocity (CV) joint, and more particularly to a ball and pocket CV joint, and even more particularly to ball and pocket CV joints having a controlled conformity ratio.

BACKGROUND

Constant velocity joints are typically employed in automotive axial drive shafts, and especially in front-wheel-drive vehicles between the transaxle differential and the driving wheel. The CV joints transmit a torque at various speeds, angles and telescopic positions between a first shaft member and a second shaft member.

Current development in the field of CV joints is primarily directed toward improving performance of the CV joint by increasing the torque transmitting capability of the CV joint and reducing noise and vibration of the CV joint. The improved performance of the CV joint has resulted in an increased cost to manufacture the CV joint. However, there is still a demand for inexpensive and easily produced CV joints.

There are many types of CV joints. One CV joint configuration includes a rotatable first shaft that has an axle portion and a pocket end disposed at an end of the axle portion. The first shaft is rotatable about a first longitudinal axis. The pocket end is disposed within a joint housing that is disposed on an end of a second shaft. The second shaft is rotatable about a second longitudinal axis. The joint housing includes a plurality of grooves disposed within a central bore and extending along the second longitudinal axis. The pocket end includes a diameter transverse to the first longitudinal axis that is greater than a diameter of the axle portion of the first shaft. The pocket end defines a plurality of semi-spherical pockets that are circumferentially and radially disposed about the first longitudinal axis in a configuration that is complementary relative to the plurality of grooves. As such, the number of pockets is equal to the number of grooves. The CV joint includes a plurality of spherical drive balls with one drive ball rotatably disposed within each pocket and corresponding groove. The pocket end and first shaft are moveable and may be articulated or stroked axially relative to the second shaft. As the CV joint is articulated (i.e., as the second shaft is moved relative to the first shaft by axial stroking or angulation) the drive balls roll back and forth along the grooves and rotate within the pockets.

The drive balls include a spherical shape. The pockets include a non-spherical shape, and may be defined by a gothic arch rotated about a central axis of each of the drive balls. The central axis of each of the drive balls passes through a center of the drive balls and the second longitudinal axis, and is disposed perpendicularly to the second longitudinal axis. Each of the drive balls contacts the pockets along an annular contact interface, i.e., a circular linear ring extending around the pocket.

The CV joint includes a conformity ratio, C, defined as the radius of the pocket, $r_p$, divided by the radius of the drive ball, $r_b$, such that $C=r_p/r_b$. It should be appreciated that if the radius of the pocket is equal to the radius of the drive ball, the conformity ratio is equal to 1. The conformity ratio may be described in terms of two principle conformity ratios, which are measured in mutually perpendicular planes including principle radii of curvature of the pocket. The first principle conformity ratio or transverse conformity ratio is measured along a plane perpendicular to the first longitudinal axis. The second principle conformity ratio or axial conformity ratio is measured along a plane parallel to the first longitudinal axis and perpendicular to the central axis of the ball and pocket. These ratios are measured at the point of contact of the ball and pocket.

Typically, the conformity ratio for CV joints having spherical pockets is between 1.01 and 1.04, including both the axial conformity ratio and the transverse conformity ratio. In the style of CV joints described above, i.e., ball and pocket style CV joints, both principle conformity ratios between the pockets and the drive balls being relatively close produces a higher amount of friction than in the other styles of CV joints. Higher friction within the CV joint reduces the overall performance of the CV joint, and is therefore undesirable.

Thus, it is desirable to provide ball and pocket style CV joints having reduced friction and improved joint performance.

SUMMARY OF THE INVENTION

In one exemplary embodiment of the present invention, a constant velocity joint is provided. The joint includes a first rotatable shaft having a first longitudinal axis, the first shaft comprising an axle portion having on one end thereof an enlarged pocket end, the pocket end having a plurality of circumferentially and radially spaced ball pockets formed therein. The joint also includes a corresponding plurality of spherical balls disposed in the ball pockets. The joint further includes a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis, the joint housing disposed over the pocket end with the corresponding plurality of balls disposed in the ball grooves, thereby forming a joint that is configured to provide a range of angular movement and a range of axial movement of the first shaft relative to the second shaft, each of the plurality of ball pockets comprising a portion of the pocket having a conformity ratio C greater than 1.04.

In another exemplary embodiment of the present invention, a constant velocity joint is provided. The joint includes a first rotatable shaft having a first longitudinal axis, the first shaft comprising an axle portion having on one end thereof an enlarged pocket end, the pocket end having a plurality of circumferentially and radially spaced ball pockets formed therein. The joint also includes a corresponding plurality of spherical balls disposed in the ball pockets. The joint further includes a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis, the joint housing disposed over the pocket end with the corresponding plurality of balls disposed in the ball grooves, thereby forming a joint that is configured to provide a range of angular movement and a range of axial movement of the first shaft relative to the second shaft, each of the plurality of ball pockets comprising a portion of the pocket having an axial conformity ratio $C_a$ and a transverse conformity ratio $C_t$, and wherein at least one of $C_a$ or $C_t$ is greater than 1.04.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
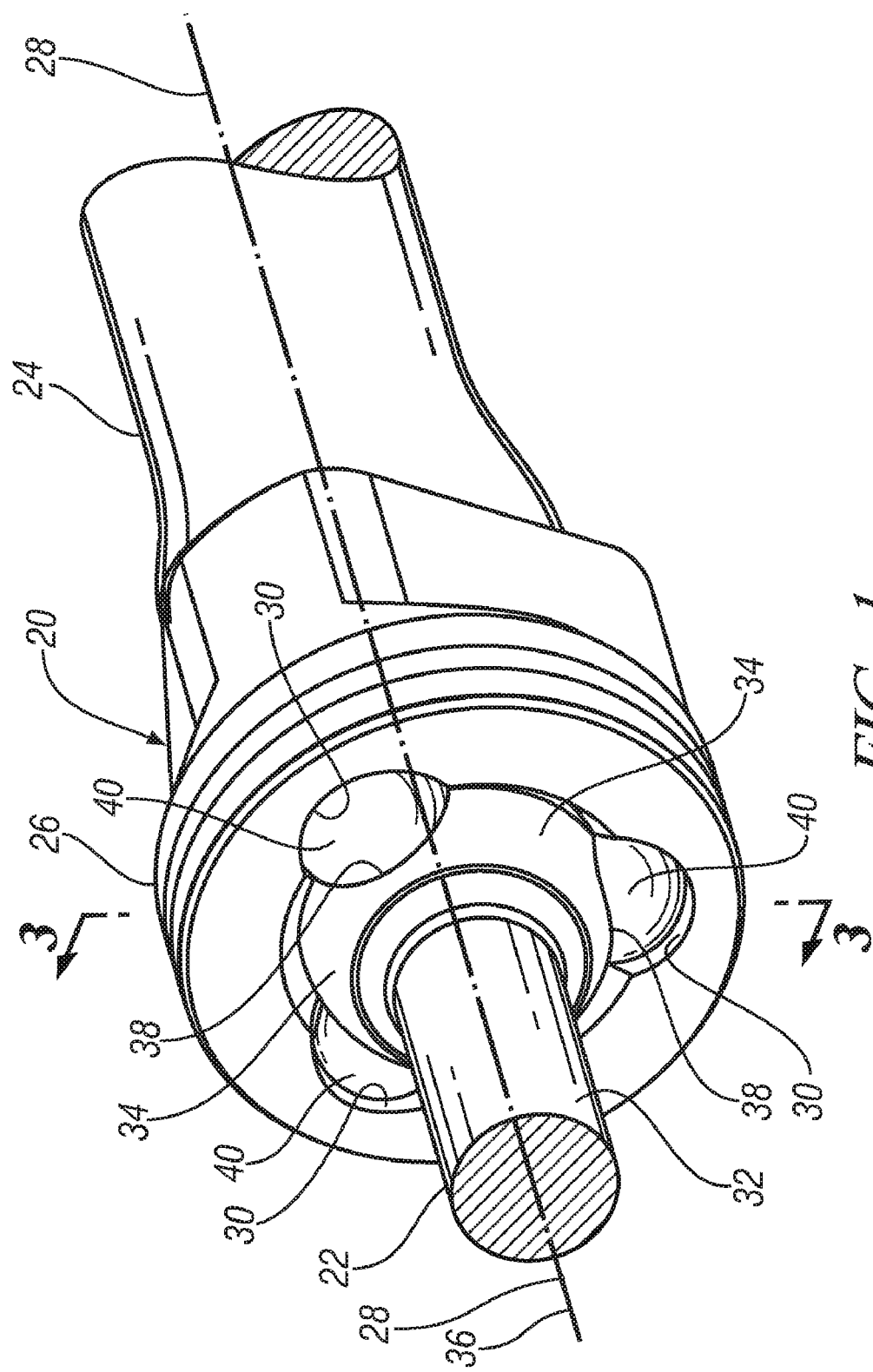
FIG. 1 is a perspective view of an exemplary embodiment of a CV joint as disclosed herein.

The following description is merely exemplary in nature and is not intended to limit the present disclosure, application or uses. It should be understood that throughout the drawings, corresponding reference numerals indicate like or corresponding parts and features.

Referring to the Figures, a CV joint is shown generally at 20. The CV joint 20 transmits a torque between a first shaft 22 and a second shaft 24 at various speeds, angles and telescopic positions. The CV joint 20 is typically employed in automotive axial drive shafts and especially in front-wheel-drive vehicles between the transaxle differential and the driving wheels as inboard and outboard CV joints. However, it should be appreciated that the CV joint 20 may be utilized in other situations in which a torque must be transmitted between shafts that articulate, i.e., move relative to each other. However, it should be appreciated that the CV joint 20, or a first shaft 22 that includes first CV joint 20 and a second CV joint (not shown), may be utilized in other situations in which a torque must be transmitted between shafts that articulate (i.e., move relative to each other, particularly those where the shafts may be angulated or telescoped, or both, relative to one another). It will also be appreciated that first CV joint 20 and second CV joint may have the same size and joint configuration or a different size and joint configuration. Since the second CV joint may be identical to CV joint 20 and could be illustrated as a mirror image thereof on first shaft 22, the description of CV joint 20 herein is equally applicable to the second CV joint and first shaft 22, and separate illustration has not been provided.

Second shaft 24 may be of any suitable shaft configuration, including solid, hollow and partially hollow shaft configurations. The second shaft 24 is rotatable about a second longitudinal axis 28. A joint housing 26 includes a plurality of radially and circumferentially spaced grooves 30 disposed within a central bore 27 of the joint housing 26 and a base 29. The grooves 30 extend along the second longitudinal axis 28. As shown, the joint housing 26 defines three grooves 30 radially and circumferentially spaced about the second longitudinal axis 28 both radially and circumferentially equidistant from each other (i.e., spaced 120 degrees apart from each other about the second longitudinal axis 28). However, it should be appreciated that the joint housing 26 may define some other number of grooves 30 greater than 3, such as 4, 5, 6, 7, 8 or more grooves 30, if design considerations so require.

Figure 2:
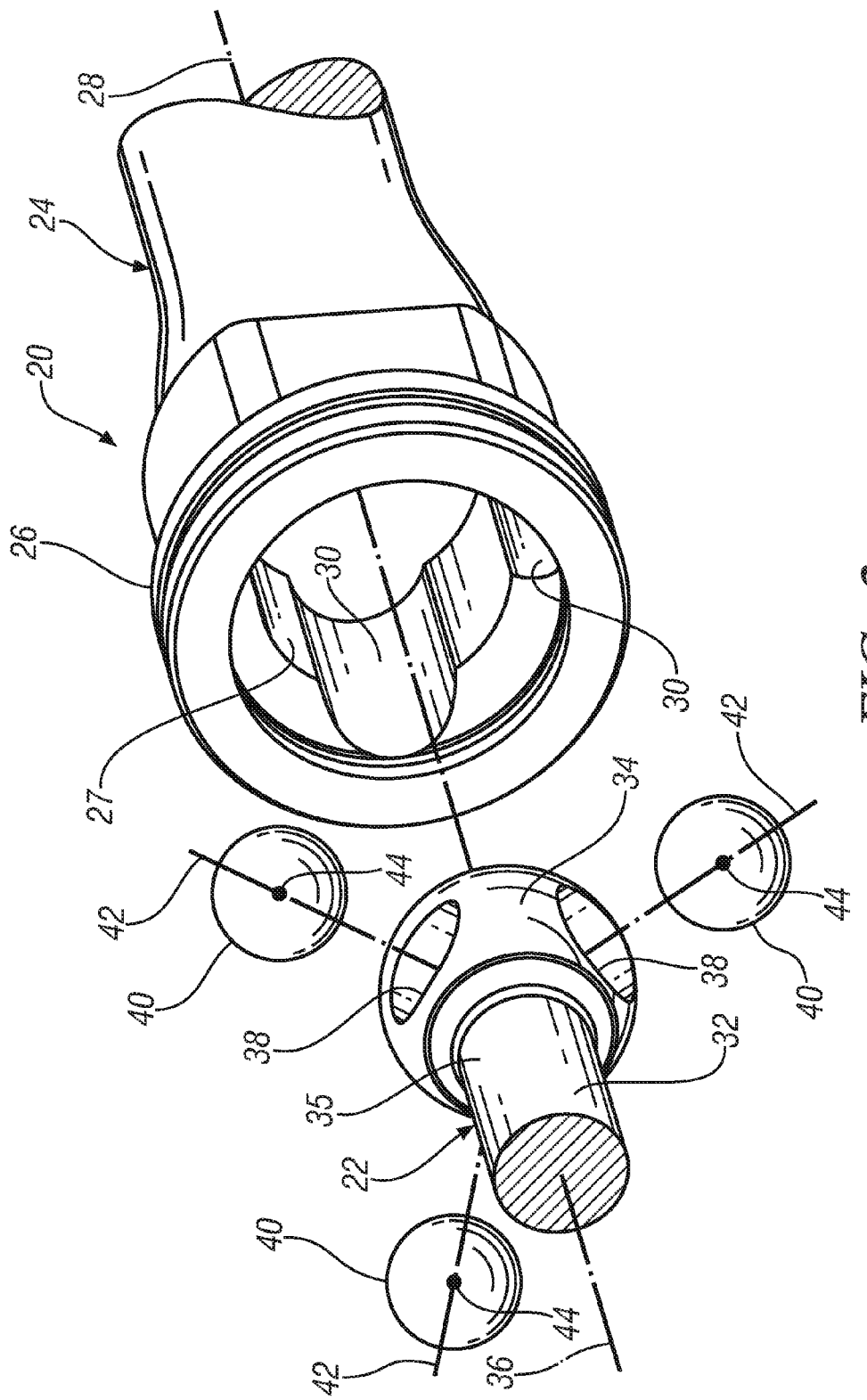
FIG. 2 is a disassembled perspective view of the CV joint of FIG. 1.
Figure 3:
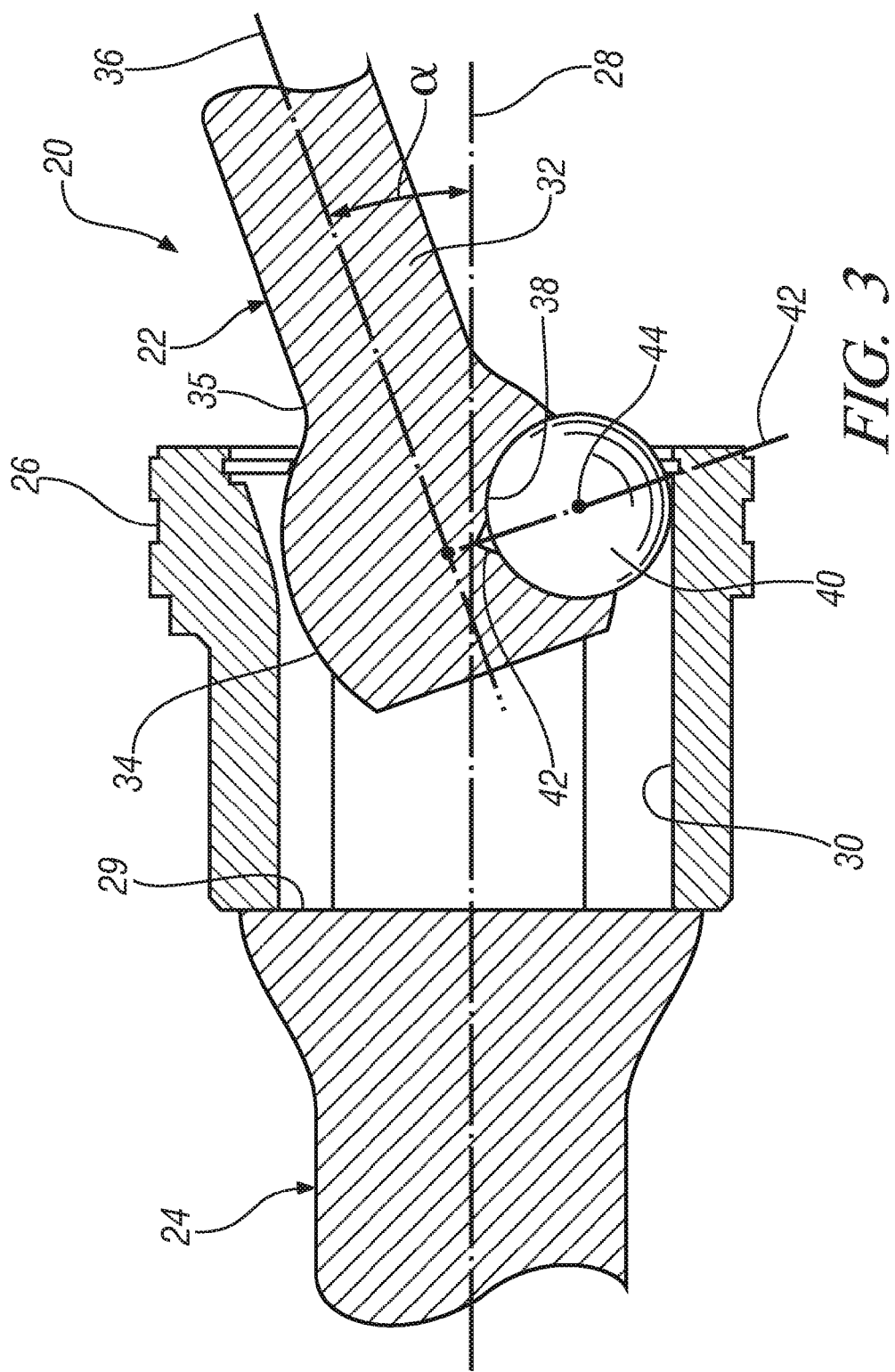
FIG. 3 is a cross-sectional view of the CV joint of FIG. 1 taken along section 3-3 and shown in an articulated configuration.

The first shaft 22 includes an axle portion 32 and on one end an enlarged pocket end portion, such as pocket end 34 in the exemplary embodiment of FIGS. 1-3. In an exemplary embodiment, the first shaft 22 may also include an enlarged second pocket end portion (not shown) on an opposite end of first shaft 22. First shaft 22 may be of any suitable shaft configuration, including solid, hollow (not shown) and partially hollow (not shown) shaft configurations. The pocket end 34 is disposed proximate an end 35 of the axle portion 32, within the joint housing 26 of the second shaft 24. The pocket end 34 is moveable relative to the second shaft 24; this includes telescoping or axial movement and angular movement through joint angle (α). The first shaft 22 is rotatable about a first longitudinal axis 36. The pocket end 34 defines a plurality of pockets 38 radially and circumferentially disposed about the first longitudinal axis 36 in a complementary orientation relative to the plurality of first grooves 30. As such, the number of pockets 38 is equal to the number of first grooves 30. As shown, the number of pockets 38 is equal to three, with the three pockets 38 radially and circumferentially spaced about the first longitudinal axis 36 equidistant from each other, i.e., the three pockets 38 are radially spaced 120 degrees apart from each other about the first longitudinal axis 36. It should be appreciated that the number of pockets 38 may differ from that shown and described herein, but is equal to the number of grooves 30 defined by the joint housing 26. Furthermore, as the first shaft 22 rotates about the first longitudinal axis 36 and the CV joint 20 articulates (i.e., as the first shaft 22 articulates relative to the second shaft 24, the drive balls 40 roll along the grooves 30 and rotate within the pockets 38).

The CV joint 20 includes a plurality of drive balls 40, with each of the drive balls 40 rotatably disposed within one of the pockets 38 and one of the grooves 30. In other words, each of the drive balls 40 is partially disposed within one of the pockets 38 and partially disposed within one of the grooves 30 opposing the pocket 38. Drive balls 40 may have any suitable configuration. In an exemplary embodiment, drive balls 40 may be spherical. The drive balls 40 are configured to transmit torque between the second shaft 24 and the first shaft 22 as they move within joint housing 26. This includes rotational movement as the second shaft 24 is rotated about the second longitudinal axis 28 and first shaft 22 is rotated about first longitudinal axis 36. It also includes movement associated with articulation of first shaft 22, second shaft 24 and CV joint 20. As first shaft 22 and second shaft 24 are angulated relative to one another the drive balls 40 are configured to roll along the grooves 30 and rotate within the pockets 38. It also includes telescoping axial movement associated with axial translation of first shaft 22 relative to second shaft 24. As first shaft 22 moves axially relative to second shaft 24, the drive balls 40 are configured to roll along the grooves 30 and rotate within the pockets 38. CV joint 20 is configured to provide any of these movements individually or simultaneously, including simultaneous rotational, angular and axial movement.

The pocket end 34 of the first shaft 22 is radially enlarged relative to the axle portion 32 of the first shaft 22 and may be configured to radially accommodate the pockets 38. Accordingly, the pocket end 34 of the first shaft 22 includes a diameter transverse to the first longitudinal axis 36 that is greater than a diameter of the axle portion 32 of the first shaft 22 transverse to the first longitudinal axis 36. In other words, the pocket end 34 of the first shaft 22 is larger than the axle portion 32 of the first shaft 22. In an exemplary embodiment, pocket end 34 may be partially spherical.

Each of the drive balls 40 includes a spherical shape and a central axis 42. The central axis 42 passes through a center 44 of the drive ball 40 and the first longitudinal axis 36, and is disposed perpendicular to the first longitudinal axis 36. The pockets 38 include a non-spherical shape. The non-spherical shape of the pockets 38 is further described below.

The CV joint 20 includes a pocket/ball conformity ratio C defined as the radius of the pocket, $r_p$, divided by the radius of the drive ball, $r_b$, or $C=r_p/r_b$. The radius of the pocket 38 is measured at a contact point where the drive ball 40 contacts the pocket 38. It should be appreciated that if the radius of the pocket 38 is equal to the radius of the drive ball 40 at the contact point, the conformity ratio C is equal to 1. Similarly, it should be appreciated that if the pocket 38 includes a flat, planar surface at the contact point, such as, for example, a flat, planar surface perpendicular to the contact angle of the drive ball 40, i.e., the flat surface is perpendicular to the radius of the drive ball 40 at the contact point, then the conformity ratio approaches infinity. The conformity ratio at a point at which a drive ball 40 contacts its respective ball pocket 38 may also be described with respect to two principle conformity ratios, which are measured in mutually perpendicular planes including principle radii of curvature of the ball pocket 38. The first principle conformity ratio or transverse conformity ratio, $C_t$, is measured along a plane perpendicular to the first longitudinal axis 36. The second principle conformity ratio or axial conformity ratio, $C_a$, is measured along a plane parallel to the first longitudinal axis 36. The conformity ratio may also be described using other frames of reference. Thus, as used herein, unless a particular frame of reference is described, reference to the conformity ratio may include any reference frame or refer to a conformity ratio in any direction, such as the direction of movement of a drive ball 40 within a pocket 38.

Figure 4:
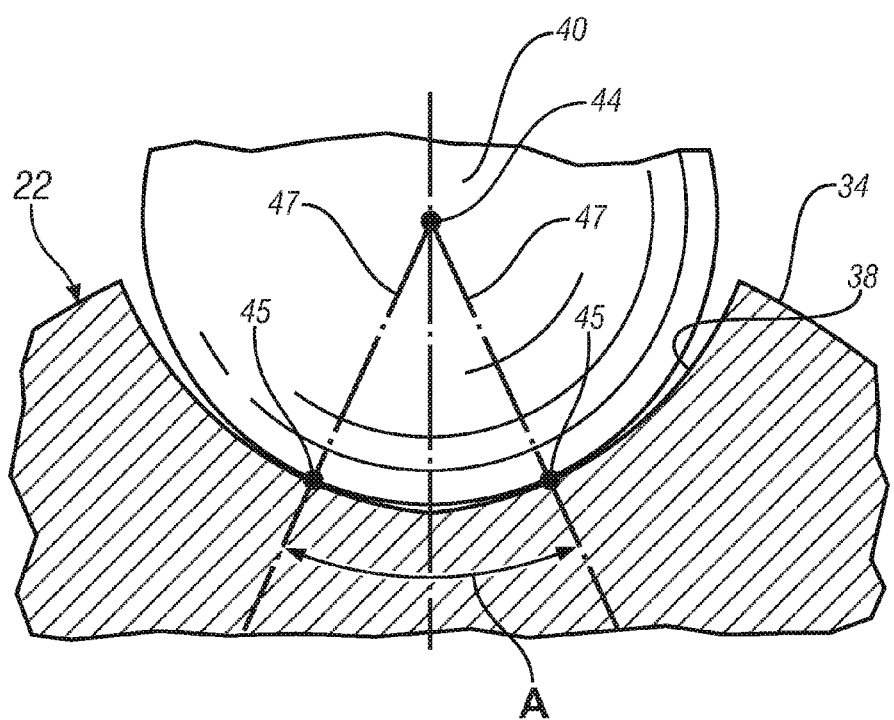
FIG. 4 is a fragmentary cross-sectional view of an exemplary embodiment of a ball and pocket as disclosed herein taken perpendicular to a first longitudinal axis of the CV joint.

As shown in FIG. 4, the drive balls 40 may contact the pockets 38 at two contact points 45 disposed on either side of the central axis 42. An inner contact angle A is defined between a pair of radial lines 47 extending from the center 44 of the drive balls 40 to the contact points 45. The contact angle A is less than one hundred eighty degrees (180°), and is preferably nearer one hundred degrees (100°).

The ball and pocket style CV joint 20 described herein includes a very low contact stress between the drive balls 40 and the pockets 38. Accordingly, the conformity ratios of the CV joint 20 may be increased, preferably to a value greater than about 1.04, to reduce the friction between the drive balls 40 and the pockets 38. In other words, the amount of friction generated by the balls rotating within the pockets 38 is reduced by decreasing the conformity between the pockets 38 and the drive balls 40, i.e., by shaping the pockets 38 to be more dissimilarly shaped than the spherical drive balls 40.

The subject invention may be achieved by increasing the first conformity ratio or transverse conformity ratio $C_t$ along a plane perpendicular to the first longitudinal axis 36, by increasing the second conformity ratio or axial conformity ratio $C_a$ along a plane parallel to the first longitudinal axis 36 and perpendicular to the central axis 42 of the drive balls 40, or by increasing both the first conformity ratio and the second conformity ratio, to a value greater than about 1.04. Alternately, the conformity ratio may be increased to a value greater than about 1.04 in other reference frames. The conformity ratio may be increased in all of the ball pocket 38 contacted by drive ball 40, or only a portion (or portions) of the ball pocket 38 that comes into contact with drive ball 40 of the range of rotational, translational and angular movement of CV joint 20.

Figure 5:
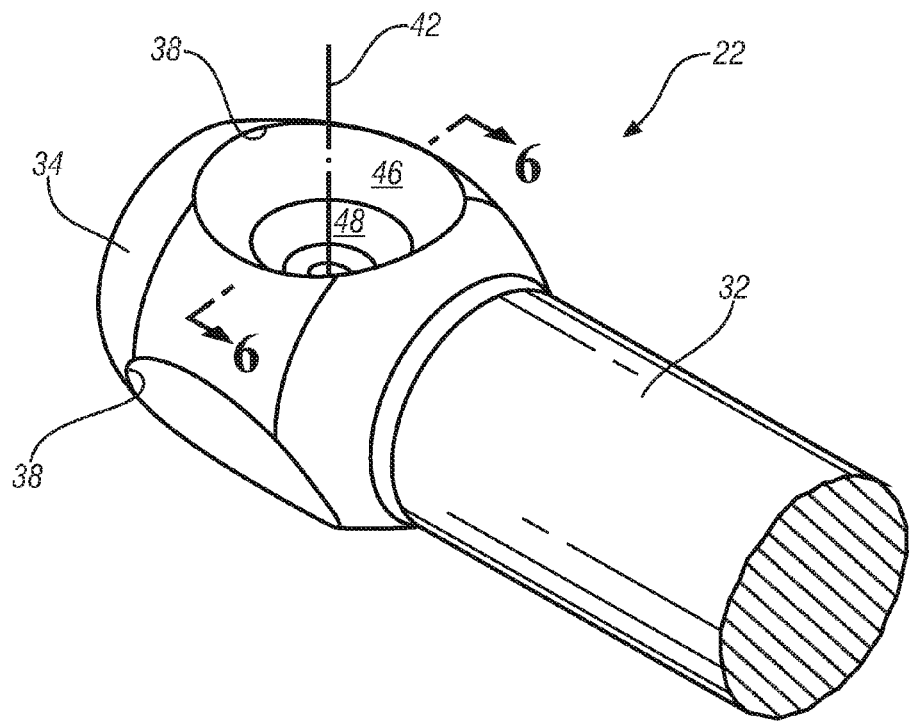
FIG. 5 is a perspective view of an exemplary embodiment of a first shaft as disclosed herein.
Figure 6:
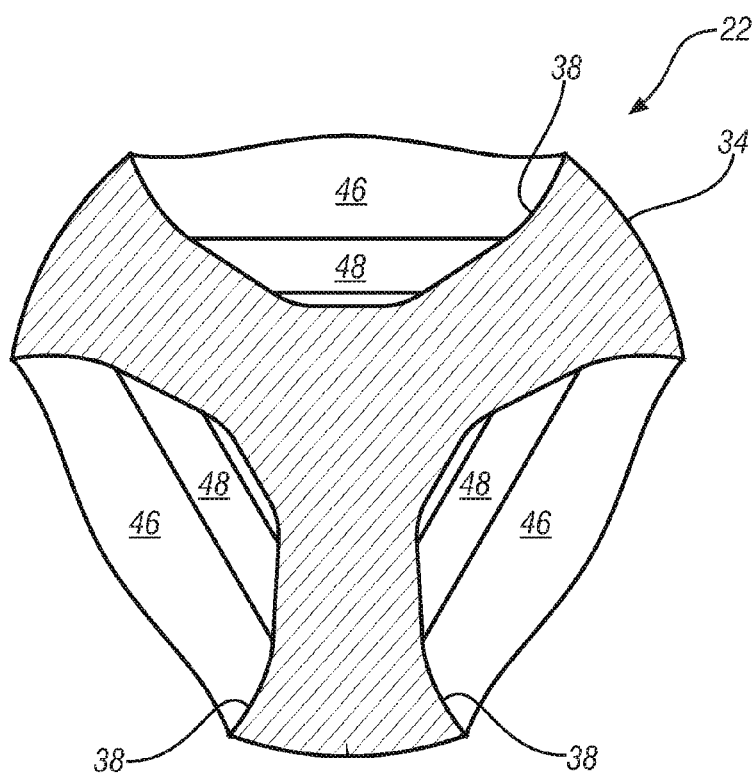
FIG. 6 is a cross-sectional view of the first shaft of FIG. 5 taken along section 6-6.

Accordingly, referring to FIGS. 5 and 6, a first exemplary embodiment of the first shaft 22 is shown. The first embodiment of the first shaft 22 includes pockets 38 in which the first conformity ratios between the pockets 38 and the drive balls 40 have been increased to a value greater than about 1.04. The pockets 38 of the first embodiment of the first shaft 22 are defined by rotating a segmented curvilinear shape including a straight line segment about the central axis 42 of the drive balls 40, which defines a peripherally extending curved portion 46 and a peripherally extending planar portion 48. Accordingly, the first conformity ratio of the first embodiment of the first shaft 22 approaches infinity. The drive balls 40 contact the pockets 38 along the peripherally extending planar portion 48, and define an annular contact interface along the plane parallel to the first longitudinal axis 36 about which the second conformity ratio is calculated. The second conformity ratio remains unchanged, i.e., equal to 1. It should be appreciated that the pocket 38 may alternatively be defined by rotating a simple curvilinear shape 50, FIG. 7, having a radius sufficiently greater than the radius of the drive balls 40 to obtain first conformity ratio greater than about 1.04, about the central axis 42. Ball pockets 38 according to this embodiment may, for example, include those having the shape of a three-dimensional truncated top, such as a spinable toy top, having an outwardly convexly-curved upper portion proximate the surface of pocket end 34 and a frustoconical lower portion.

Figure 7:
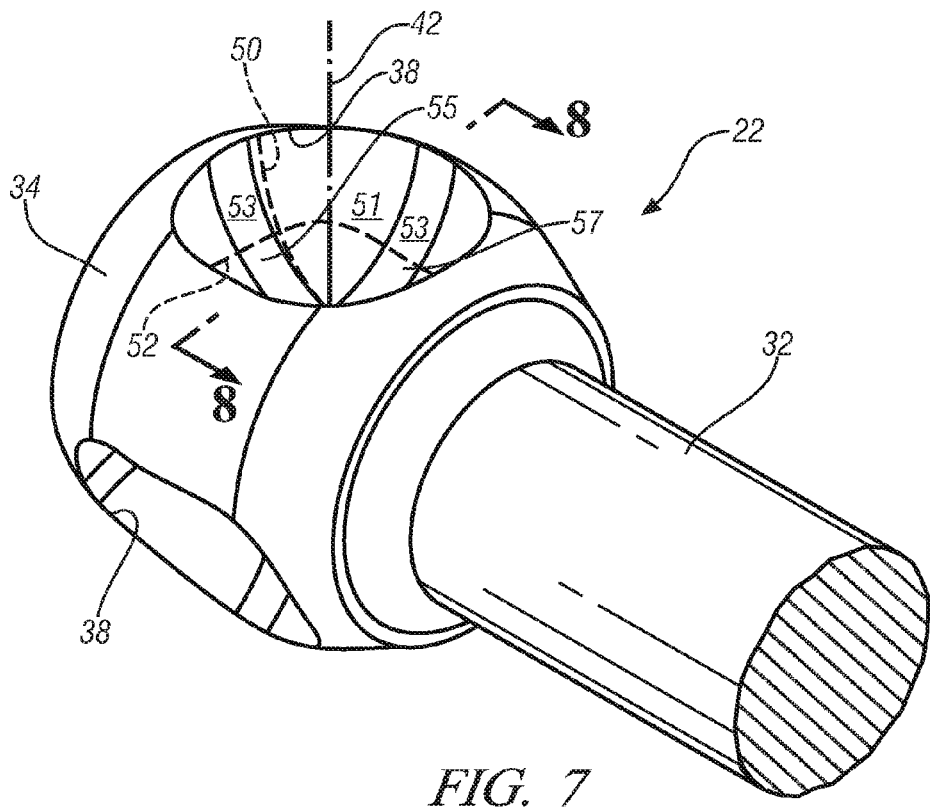
FIG. 7 is a perspective view of a second exemplary embodiment of a first shaft as disclosed herein.
Figure 8:
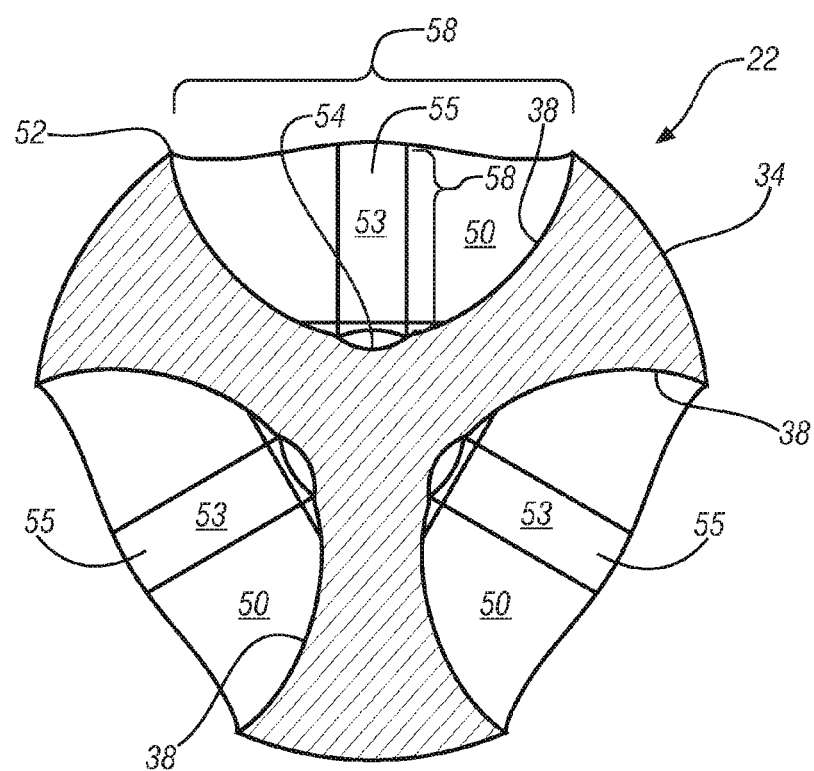
FIG. 8 is a cross-sectional view of the first shaft of FIG. 7 taken along section 8-8 and FIG. 10 is a top view of the first shaft of FIG. 7.
Figure 10:
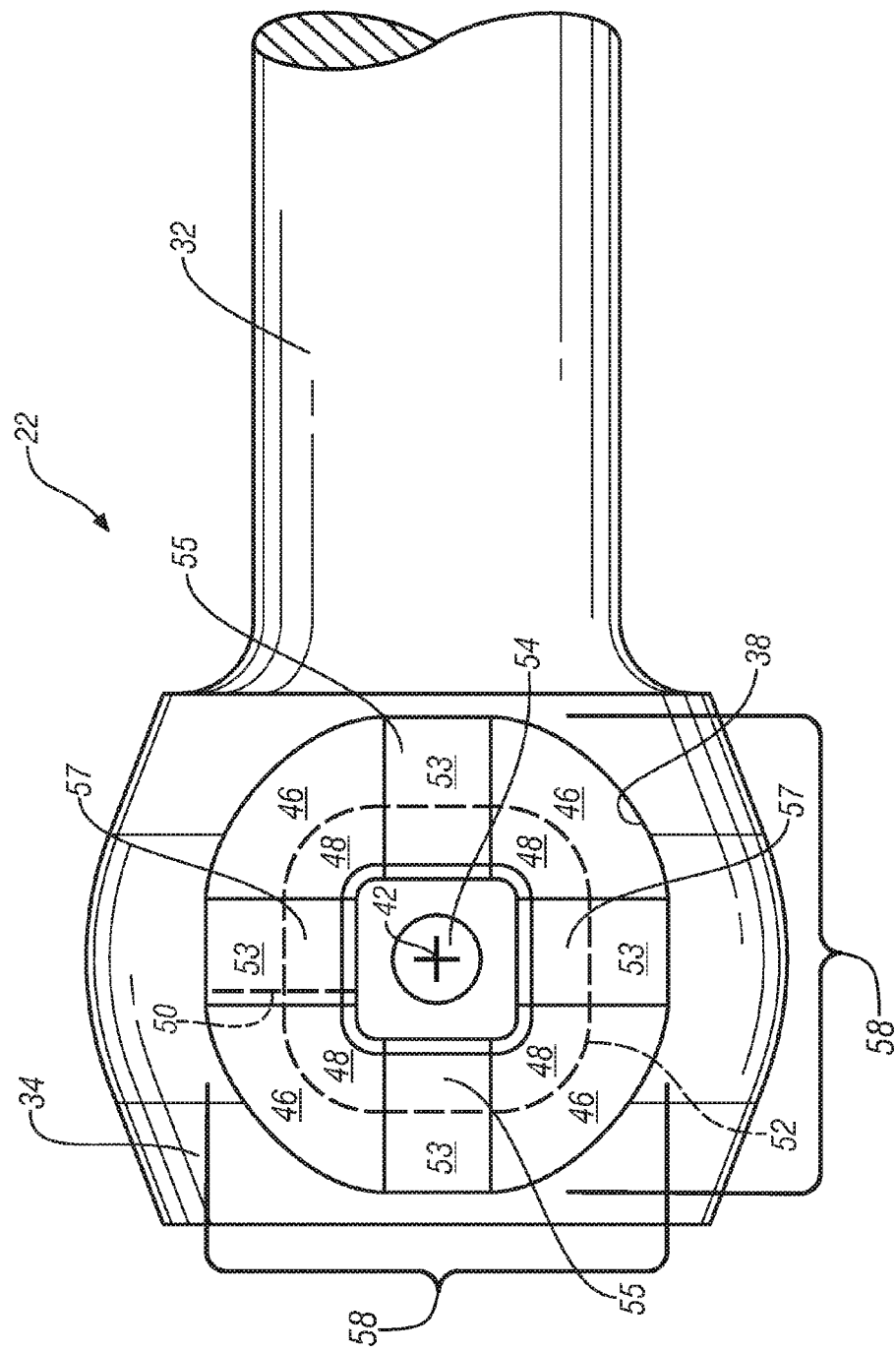

Referring to FIGS. 7, 8 and 10, a second exemplary embodiment of the first shaft 22 is shown. The second embodiment of the first shaft 22 includes pockets 38 in which the second conformity ratios between the pockets 38 and the drive balls 40 have been increased to a value greater than about 1.04. The pockets 38 of the second embodiment of the first shaft 22 are defined by sweeping a curvilinear shape 50 about central axis 42 along a non-circular path 52. The path 52 may include an elliptical path 52, a square path 52, a rectangular path 52, or some other non-circular path 52. Accordingly, it should be appreciated that the pockets 38 are not defined by rotating the curvilinear shape 50 about the central axis 42, but rather by sweeping the curvilinear shape along the path 52. When the curvilinear shape 50 is swept around a rounded square path 52 or a rounded rectangular path 52 such as shown in FIGS. 7 and 8, the resultant pocket 38 includes generally curved surfaces 51 in the corners separated by two-dimensional curvilinear planar surfaces 53, which generally form a cross when viewed from above. Curvilinear planar surfaces 53 include an axial portion 55 and a transverse portion 57. Accordingly, the second conformity ratio in the two-dimensional curvilinear planar surfaces 53 of the path 52 will approach infinity. The drive balls 40 contact the pocket 38 at the two-dimensional curvilinear planar surfaces 53 along the plane parallel to the first longitudinal axis 36 to define multiple independent and separate contact interfaces (as opposed to the continuous annular contact interface achieved with the first embodiment of the second shaft pocket 24). The first conformity ratio remains unchanged, i.e., less than or equal to about 1.04. Ball pockets 38 according to this embodiment may, for example, include those having the shape of a truncated rounded rectangular box (i.e., a truncated rectangular box with rounded corners) or a truncated ellipsoid.

As shown, in FIG. 8, the second embodiment of the first shaft 22 includes a grease pocket 54 disposed at a base of each pocket 38. The grease pocket 54 stores grease therein to lubricate the drive balls 40 within the pockets 38. It should be appreciated that a similar grease pocket 54 may be incorporated into the pockets 38 of the first embodiment of the first shaft 22 described above and the third embodiment of the first shaft 22 described below.

Figure 9:
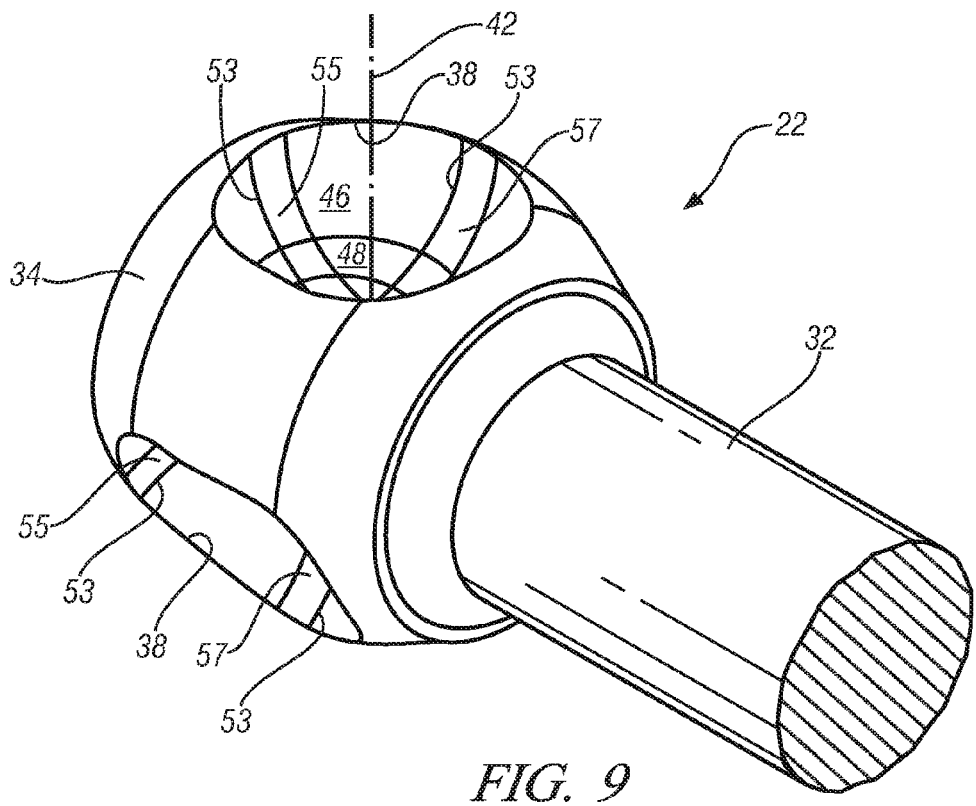
FIG. 9 is a perspective view of a third exemplary embodiment of a first shaft as disclosed herein.

Referring to FIG. 9, a third exemplary embodiment of the first shaft 22 is shown. The third embodiment of the first shaft 22 includes pockets 38 modified in accordance with both the first embodiment of the first shaft 22 and the second embodiment of the first shaft 22. Accordingly, the third embodiment of the first shaft 22 includes pockets 38 in which the first conformity ratio is greater than about 1.04 and the second conformity ratio is greater than about 1.04. The first conformity ratio of greater than about 1.04 is achieved as described above with the first embodiment of the first shaft 22. The second conformity ratio of greater than about 1.04 is achieved as described above with the second embodiment of the first shaft 22. Ball pockets 38 according to this embodiment may, for example, include those having the shape of a truncated rounded rectangular box.

The invention has been described in an illustrative manner, and it is to be understood that the terminology that has been used is intended to be in the nature of words of description rather than of limitation. It is now apparent to those skilled in the art that many modifications and variations of the present invention are possible in light of the above teachings. It is therefore, to be understood that the invention may be practiced otherwise than as specifically described.

What is claimed is:

1. A constant velocity joint, comprising:
a first rotatable shaft having a first longitudinal axis, the first shaft comprising an axle portion having on one end thereof an enlarged pocket end, the pocket end having a plurality of circumferentially and radially spaced ball pockets formed therein;
a corresponding plurality of spherical balls disposed in the ball pockets; and
a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis, the joint housing disposed over the pocket end with the corresponding plurality of balls disposed in the ball grooves, thereby forming a joint that is configured to provide a range of angular movement and a range of axial movement of the first shaft relative to the second shaft, each of the plurality of ball pockets comprising a portion of the pocket having a conformity ratio C greater than about 1.04.

2. The constant velocity joint of claim 1, wherein the portion of the pocket having a conformity ratio greater than about 1.04 comprises a peripheral portion disposed about a central axis of the pocket.

3. The constant velocity joint of claim 2, wherein the peripheral portion comprises a planar surface.

4. The constant velocity joint of claim 1, wherein the portion of the pocket having a conformity ratio greater than about 1.04 comprises an axial portion.

5. The constant velocity joint of claim 4, wherein the axial portion comprises a planar surface.

6. The constant velocity joint of claim 1, wherein the portion of the pocket having a conformity ratio greater than about 1.04 comprises a transverse portion.

7. The constant velocity joint of claim 6, wherein the transverse portion comprises a planar surface.

8. The constant velocity joint of claim 1, wherein the portion of the pocket having a conformity ratio greater than about 1.04 comprises a peripheral portion disposed about a central axis of the pocket, an axial portion or a transverse portion, or a combination thereof.

9. The constant velocity joint of claim 1, wherein the plurality of ball pockets comprises three or more ball pockets.

10. The constant velocity joint of claim 1, wherein the plurality of ball pockets have a shape that comprises an outwardly convexly curved upper portion and a frustoconical lower portion, a truncated ellipsoid or a truncated rounded rectangular box.

11. A constant velocity joint, comprising:
a first rotatable shaft having a first longitudinal axis, the first shaft comprising an axle portion having on one end thereof an enlarged pocket end, the pocket end having a plurality of circumferentially and radially spaced ball pockets formed therein;
a corresponding plurality of spherical balls disposed in the ball pockets; and
a second rotatable shaft having a second longitudinal axis and comprising a joint housing disposed on an end thereof, the joint housing having a central bore with a corresponding plurality of axially extending, circumferentially and radially spaced ball grooves disposed therein about the second longitudinal axis, the joint housing disposed over the pocket end with the corresponding plurality of balls disposed in the ball grooves, thereby forming a joint that is configured to provide a range of angular movement and a range of axial movement of the first shaft relative to the second shaft, each of the plurality of ball pockets comprising a portion of the pocket having an axial conformity ratio $C_a$ and a transverse conformity ratio $C_t$, and wherein at least one of $C_a$ or $C_t$ is greater than about 1.04.

12. The constant velocity joint of claim 11, wherein the portion having at least one of $C_a$ or $C_t$ is greater than about 1.04 comprises a peripheral portion disposed about a central axis of the pocket.

13. The constant velocity joint of claim 12, wherein the peripheral portion comprises a planar surface.

14. The constant velocity joint of claim 11, wherein the portion having at least one of $C_a$ or $C_t$ greater than about 1.04 comprises an axial portion.

15. The constant velocity joint of claim 14, wherein the axial portion comprises a planar surface.

16. The constant velocity joint of claim 11, wherein the portion having at least one of $C_a$ or $C_t$ greater than about 1.04 comprises a transverse portion.

17. The constant velocity joint of claim 16, wherein the transverse portion comprises a planar surface.

18. The constant velocity joint of claim 11, wherein the portion having at least one of $C_a$ or $C_t$ greater than about 1.04 comprises a peripheral portion disposed about a central axis of the pocket, an axial portion or a transverse portion, or a combination thereof.

19. The constant velocity joint of claim 11, wherein the plurality of ball pockets comprises three or more ball pockets.

20. The constant velocity joint of claim 11, wherein the plurality of ball pockets have a shape that comprises an outwardly convexly curved upper portion and a frustoconical lower portion, a truncated ellipsoid or a truncated rounded rectangular box.

* * * * *